United States Patent
Salvo et al.

(10) Patent No.: US 9,490,995 B1
(45) Date of Patent: Nov. 8, 2016

(54) SIMULATION SYSTEM FOR NETWORK DEVICES IN A NETWORK

(71) Applicant: Juniper Networks, Inc., Sunnyvale, CA (US)

(72) Inventors: Christopher R. Salvo, Fremont, CA (US); Bruce A. Florip, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 737 days.

(21) Appl. No.: 13/666,323

(22) Filed: Nov. 1, 2012

(51) Int. Cl.
*G06F 17/50* (2006.01)
*G06G 7/62* (2006.01)
*H04L 12/26* (2006.01)

(52) U.S. Cl.
CPC ................................. *H04L 12/2602* (2013.01)

(58) Field of Classification Search
CPC ........... H04L 12/2602; H04L 12/2419; H04L 67/125
USPC ...................................... 703/13, 21; 709/224
See application file for complete search history.

(56) References Cited

U.S. PATENT DOCUMENTS

| | | | | |
|---|---|---|---|---|
| 5,272,723 A * | 12/1993 | Kimoto | ..................... | G06N 3/04 375/232 |
| 7,620,535 B2 * | 11/2009 | Shevenell et al. | ............... | 703/13 |
| 2004/0111502 A1 * | 6/2004 | Oates | ............................ | 709/223 |
| 2006/0149524 A1 * | 7/2006 | Kalyanaraman et al. | ...... | 703/13 |
| 2008/0025227 A1 * | 1/2008 | Puttu et al. | .................... | 370/244 |
| 2008/0086295 A1 * | 4/2008 | Okada | ................. | H04L 12/2602 703/21 |
| 2009/0124250 A1 * | 5/2009 | Topaltzas | ............... | H04W 24/06 455/423 |
| 2010/0153055 A1 * | 6/2010 | Mucha et al. | ................ | 702/122 |
| 2013/0347103 A1 * | 12/2013 | Veteikis et al. | ................ | 726/22 |

* cited by examiner

*Primary Examiner* — Eunhee Kim
(74) *Attorney, Agent, or Firm* — Harrity & Harrity, LLP (57) ABSTRACT

A computing device is configured to receive information for setting up a simulation of a device. The computing device is further configured to request one or more modules corresponding to one or more features associated with the simulation. The computing device is further configured to receive the one or more modules. The computing device is further configured to perform the simulation using the one or more modules and the different modules. The computing device is further configured to determine that the simulation requires debugging based on a result of the simulation. The computing device is configured to further debug the simulation based on determining that the simulation requires debugging, and provide the result of the simulation including information associated with the debugging of the simulation.

20 Claims, 10 Drawing Sheets

| Feature: NAT | Method in class |
|---|---|
| Class config method | 2 |
| DUT config method | 4 |
| Issue traffic cmd method | 8 |
| Debug feature config method | 0 |
| Health/monitor config method | 128 |

SIMULATION SYSTEM FOR NETWORK DEVICES IN A NETWORK

BACKGROUND

A network device may be tested within a simulated environment on a computing device. The simulation may provide information regarding the capabilities of the network device before operating the network device within a network.

SUMMARY

According to some example implementations, a computing device may receive information for setting up a simulation of a device; request one or more modules corresponding to one or more features associated with the simulation based on receiving the information; receive the one or more modules based on requesting the one or more modules, the one or more modules having a relationship with different modules stored by the computing device; perform the simulation using the one or more modules and the different modules; determine that the simulation requires debugging, based on a result of the simulation; debug the simulation based on determining that the simulation requires debugging; and provide the result of the simulation including information associated with the debugging of the simulation.

According to some example implementations, a method, performed by a computing device, may include receiving information for setting up a simulation of a device; requesting one or more modules corresponding to one or more features associated with the simulation based on receiving the information; receiving the one or more modules based on requesting the one or more modules, the one or more modules having a relationship with different modules stored by the computing device; performing the simulation using the one or more modules and the different modules and using the relationship between the one or modules and the different modules; determining to debug the simulation, based on a result of the simulation; and providing the result of the simulation including information recommending to debug the simulation based on determining to debug the simulation.

According to some example implementations, a computer-readable medium may include a group of instructions which, when executed by one or more processors of a computing device, cause the one or more processors to receive information for setting up a simulation of a device; request one or more modules corresponding to one or more features associated with the simulation based on receiving the information; receive the one or more modules based on requesting the one or more modules, the one or more modules having a relationship with different modules stored by the computing device; perform the simulation using the one or more modules, the different modules, and the relationship between the different modules and the one or more modules; determine to debug the simulation, based on a result of the simulation; and provide the result of the simulation including information recommending to debug the simulation based on determining to debug the simulation.

BRIEF DESCRIPTION OF DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An implementation, described herein, may permit a user, using an application, to test a network device during a simulated environment on a computing device. The application may perform the simulation, provide a result to the user that includes information about the errors during the simulation, and provide recommendations on how to improve the simulation. Further, the application may permit the user to change the simulation for different conditions.

For example, a user, of a computing device, may be interested in simulating the functionality of a router device by using an application to create and run a simulation of the router with multimedia network traffic. The user may use the application to enter various parameters (e.g., network traffic parameters, network topology, etc.) of the router device and also what features (e.g., a firewall feature, a network area translation (NAT) feature, etc.) the user is interested in testing. Once the simulation is started, the application may dynamically test the multiple features requested by the user. The application may also determine potential errors in the simulation and also determine which features, during the simulation, may be causing the errors. Based on the outcome of the simulation, the user may change the simulation by changing one or more of the simulation parameters.

Figure 1A:
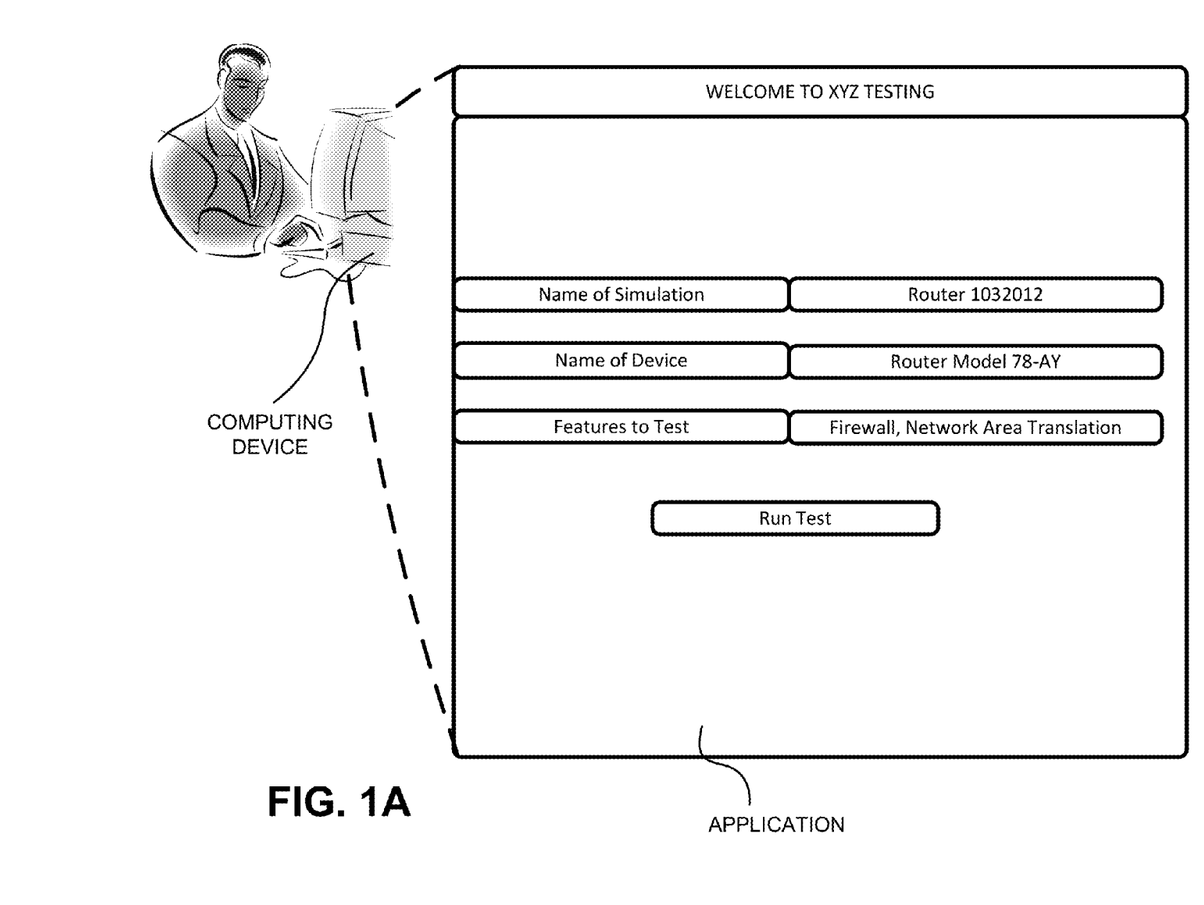
FIGS. 1A-1B are diagrams of an overview of an implementation described herein.
Figure 1B:
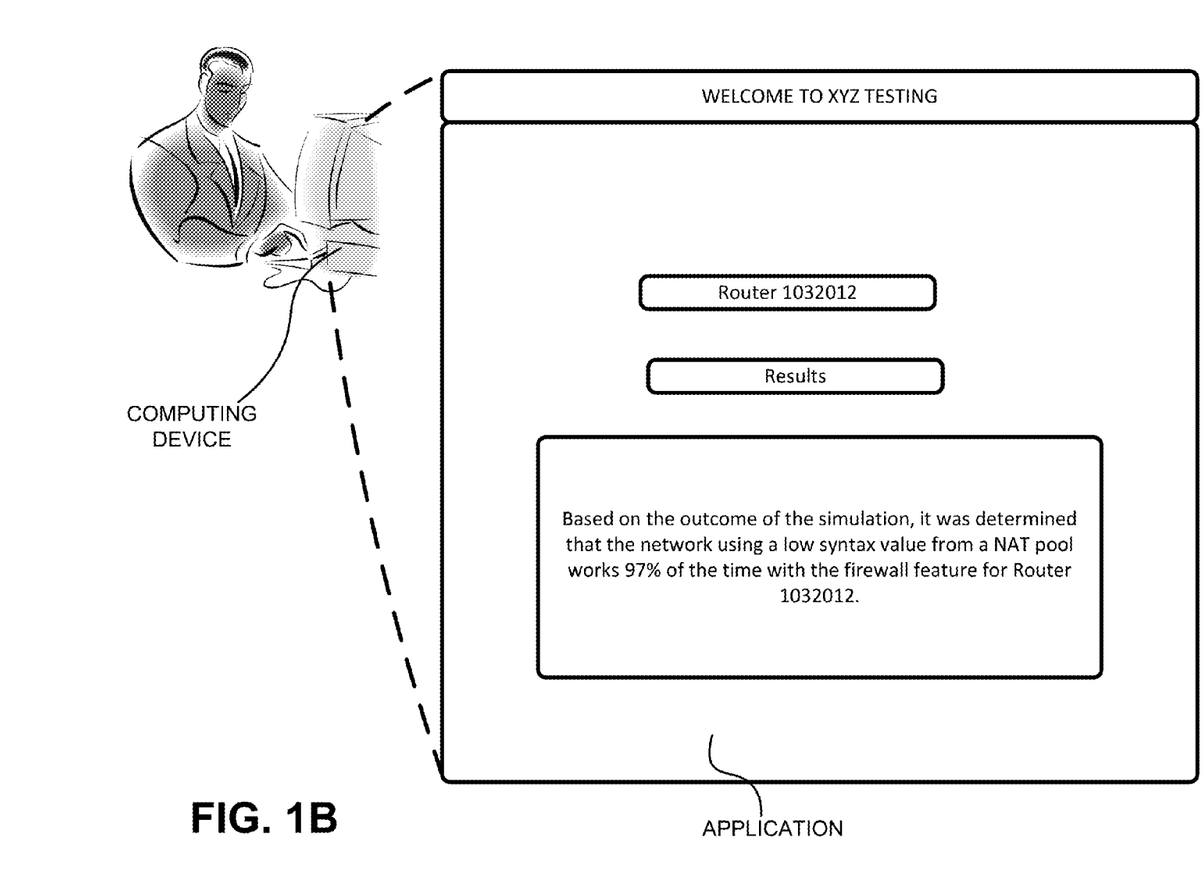

FIGS. 1A-1B are diagrams of an overview of an implementation described herein. As shown in FIG. 1A, assume that a user is using an application, XYZ Testing, on a computing device to create a simulation of the operation of a network device. The user is given a number of options within the application. The user is given an option, in the application, to provide a name for the simulation ("Router 1032012"). The user is given the option, in the application, to select the type of network device ("Router Model 78-AY") that is to be tested in the simulation. Further, the user is given the option, in the application to select which features (firewall and network area translation) of the network device are to be tested. Once the user has entered the information into the XYZ Testing application, the user may select the "Run Test" icon to begin the simulation. The selections made by the user may result in the application using particular modules from a library of modules to implement the simulation.

As shown in FIG. 1B, the XYZ Testing application may provide the user with the results of the simulation. The results may include the relationship between the features and also reasons why the simulation is providing a level of errors associated with the simulation and recommendations to the user on how to improve the simulation to reduce the number of errors.

By permitting the user to change the parameters of a simulation (using modules from a library), the application may permit the user to create multiple simulations within a shorter amount of time and also permit the user to understand how different parameters, during the simulation, interact with each other without the user having to rewrite the code for different simulations.

Figure 2:
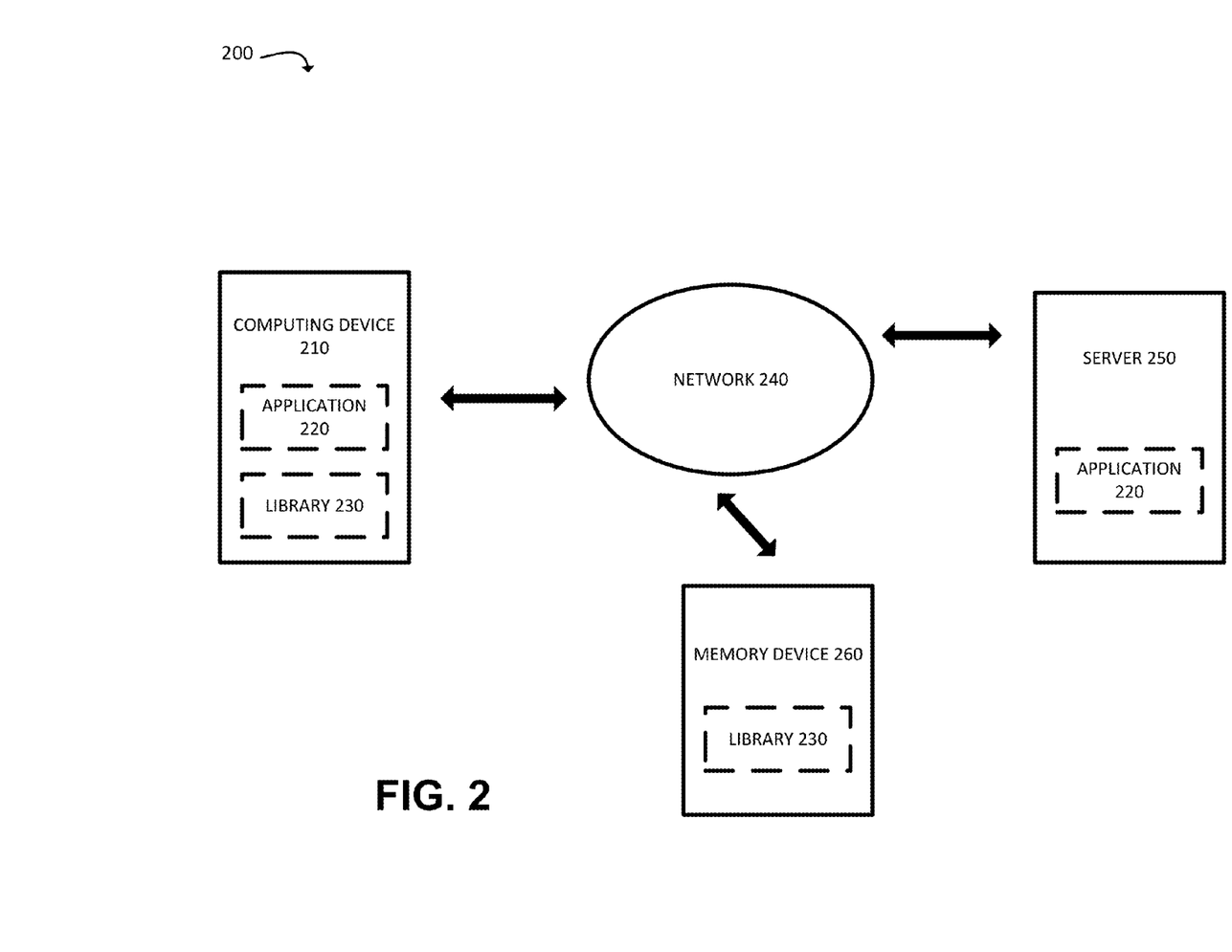
FIG. 2 is a diagram of an example environment in which systems and/or methods described herein may be implemented.

FIG. 2 is a diagram of an example environment 200 in which systems and/or methods described herein may be implemented. In some implementations, environment 200 may include a collection of devices associated with a private network, such as a corporate network, a residential network, or the like. In some implementations, environment 200 may include a collection of devices associated with a public network or a combination of a private network and a public network.

As shown in FIG. 2, environment 200 may include a computing device 210, an application 220, a library 230, a network 240, a server 250, and a memory device 260.

Computing device 210 may include one or more devices. For example, computing devices 210 may include a personal computer, a laptop, a server, a workstation, and/or any other type of device capable of communicating with a network.

Application 220 may include an application that is stored on and/or executed by computing device 210 and/or server 250. Application 220 may provide, for display on computing device 210, a user interface that enables design, analysis, and generation of simulations of devices within a network environment. Application 220 may generate one or more simulations (based on user inputs into the user interface) of devices within a network environment and provide the outcome of the simulation, via a user interface, to the user of computing device 210. Application 220 may use modules and/or sub-modules of different simulation parameters that are stored by application 220 and/or library 230. Application 220 may be run by multiple networked computing devices 220. In such an implementation, application 220 may be executed in a distributed manner, such as multiple instances of the application being executing on multiple computing devices 210 simultaneously.

Library 230 may be an application that is stored on and/or executed by computing device 210 or memory device 260. Library 230 may, in response to a request from application 220, store and/or retrieve a module, a sub-module, or any other type of data structure associated with a device that can be used to simulate operation of the device. Library 230 may be located within computing device 210 and/or memory device 260. In some implementations, library 230 and application 220 may be implemented within the same application. In some other implementations, library 230 and application 220 may be separate applications.

Network 240 may include one or more networks, such as a wide area network (WAN) (e.g., the Internet), a local area network (LAN), a metropolitan area network (MAN), a telephone network (e.g., the Public Switched Telephone Network (PSTN) or a cellular network), a satellite network, or a combination of networks. In some implementations, network 240 may correspond to a private network, a public network, or a combination of a private network and public network.

Server 250 may include one or more server devices that provide access to application 220, as a remote service, via network 240. In one example implementation, server 250 may host application 220 and may execute application 220 to simulate the operation of a device. Server 250 may provide results of the simulation to computing device 210 and/or publish the results as a service to be subscribed to by computing device 210. Additionally, or alternatively, access to application 220 may be provided as a web service. The web service may provide access to one or more programs provided by server 250.

Memory device 260 may include one or more memory devices that gather, store, and/or provide information described herein. Memory device 260 may store information associated with library 230 (as described above). In some implementations, memory device 260 and computing device 210 may be implemented within the same device. In some other implementations, memory device 260 and computing device 210 may be implemented within different devices.

The example quantity and configuration of devices illustrated in FIG. 2 are provided for simplicity. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
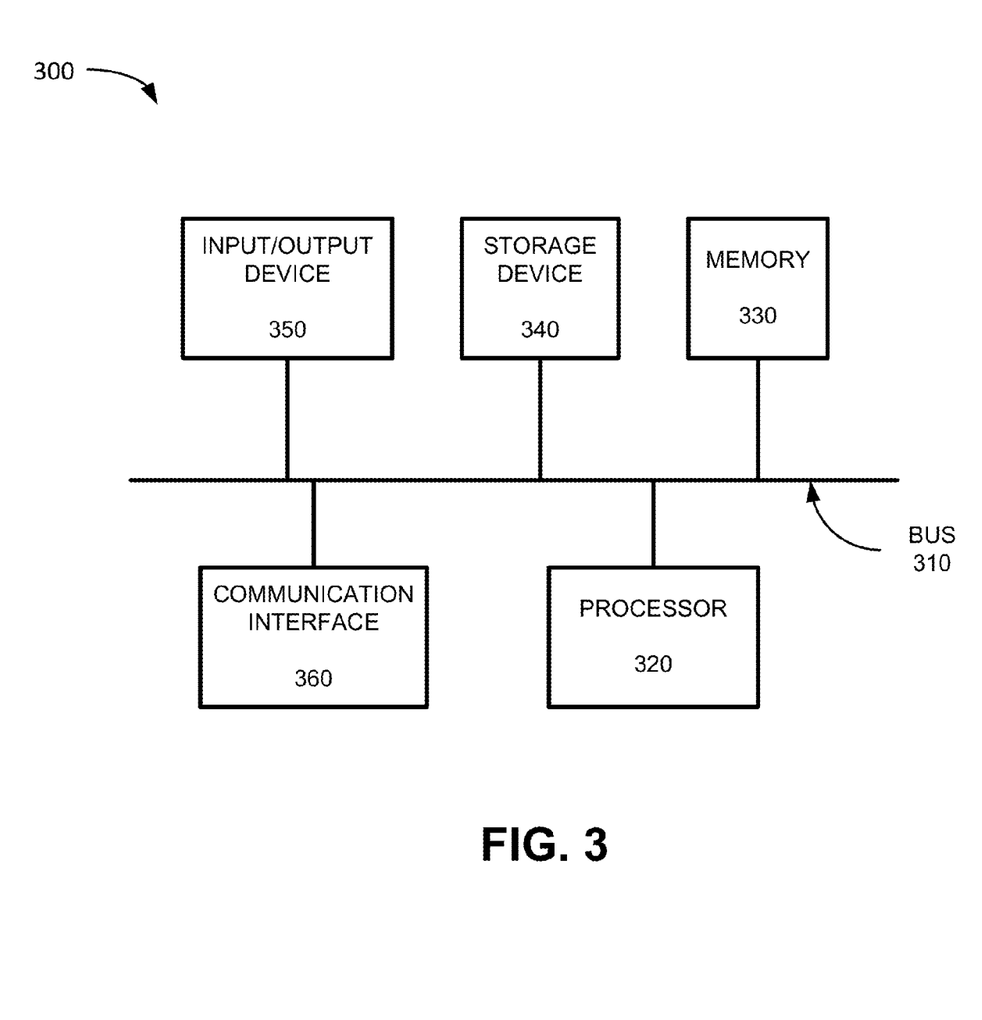
FIG. 3 is a diagram of example components of one or more devices of FIG. 2.

FIG. 3 is a diagram illustrating example components of a device 300. Device 300 may correspond to one or more of the devices illustrated in FIG. 2. For example, computing device 210, server 250, and/or memory device 260 may include one or more devices 300 and/or one or more components of device 300.

As shown in FIG. 3, device 300 may include a bus 310, a processor 320, a memory 330, a storage device 340, an input/output device 350, and a communication interface 360. Bus 310 may include a path, or a collection of paths, that permits communication among the components of device 300.

Processor 320 may include a processor, a microprocessor, an application specific integrated circuit (ASIC), a field programmable gate array (FPGA), or another type of processing component that interprets and executes instructions. Memory 330 may include a random access memory (RAM) or another type of dynamic storage device that stores information and/or instructions for execution by processor 320; a read only memory (ROM) or another type of static storage device that stores static information and/or instructions for use by processor 320; and/or another type of memory, such as a hard drive, a cache, or a flash memory. Storage device 340 may include a recording medium to store data that may be used by processor 320.

Input/output device 350 may include a component that permits an operator to input information to device 300, such as a button, a keyboard, a keypad, a touch screen display, or the like; and/or a component that outputs information to the operator, such as a light emitting diode (LED), a display, a speaker, or the like.

Communication interface 360 may include any transceiver-like component that enables device 300 to communicate with other devices and/or systems. For example, communication interface 360 may include a separate transmitter and receiver, or a transceiver that combines the functionality of both a transmitter and a receiver. Communication interface 360 may include a wired interface, a wireless interface, or both a wired interface and a wireless interface.

Device 300 may perform certain operations, as described in detail below. According to an example implementation, device 400 may perform these operations in response to processor 320 executing sequences of instructions contained in a computer-readable medium, such as memory 330. A computer-readable medium may be defined as a non-transitory memory device. A memory device may include memory space within a single physical storage device or spread across multiple physical storage devices.

The software instructions may be read into memory 330 from another computer-readable medium, such as storage device 340, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in some implementations, device 300 may include additional components, fewer components, different components, or differently-arranged components.

Figure 4:
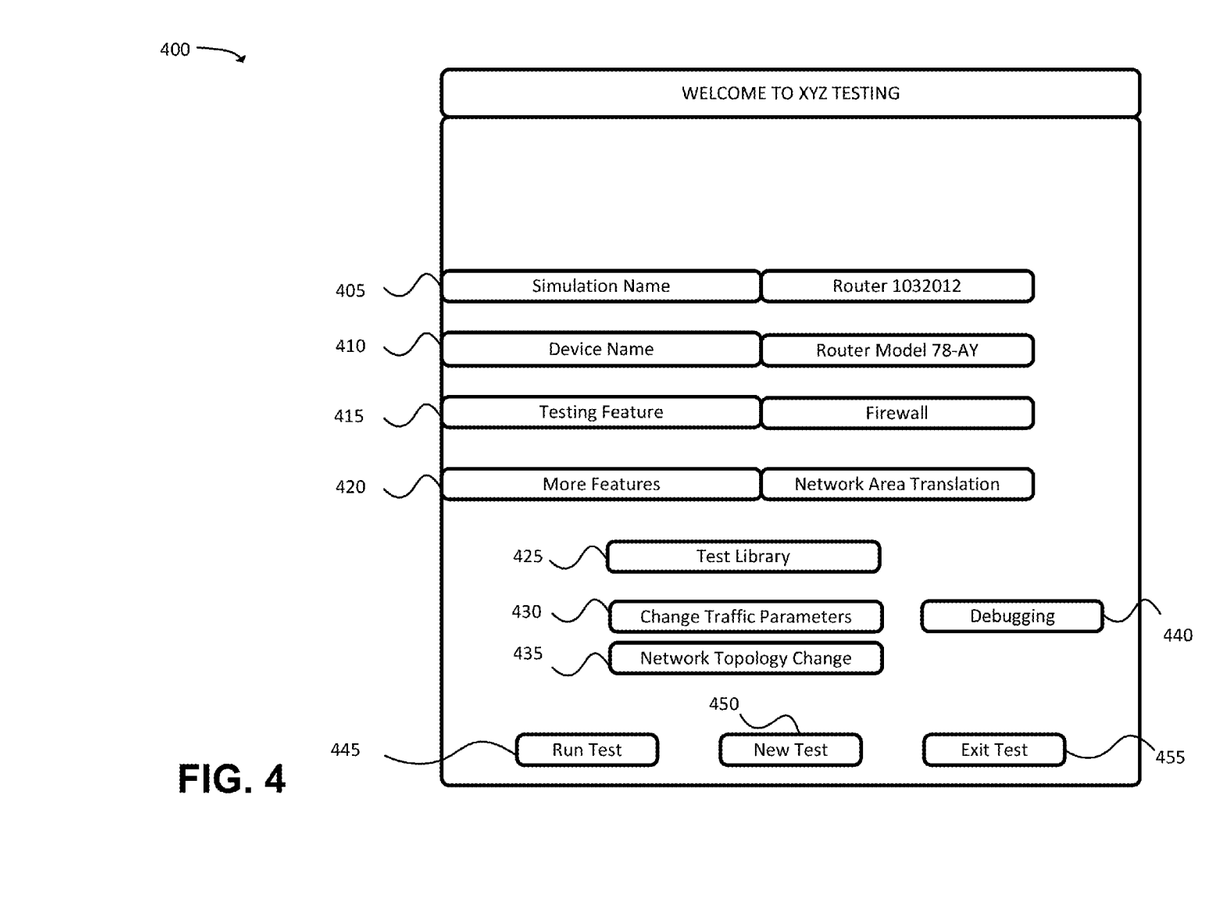
FIG. 4 is a diagram of an example user interface via which information, for setting up a simulation, may be received.

FIG. 4 is a diagram of an example user interface 400 via which information, for setting up a simulation of a network device, may be received. User interface 400 may be provided, for display on computing device 210, to permit a user, of computing device 210, to set parameters for simulating the operation of a network device. User interface 400 may be associated with application 220. As illustrated in FIG. 4, user interface 400 may include a collection of fields and/or buttons, such as a simulation name field 405, a device name field 410, a testing feature field 415, a more features field 420, a test library field 425, a change traffic parameters field 430, a network topology change field 435, a debugging field 440, a run test field 445, a new test field 450, and an exit test field 455.

Each field may, when selected by the user, provide the user with a drop-down list of options. Additionally, or alternatively, each field may permit the user to enter information.

One or more of the fields in user interface 400 may be associated with a module and/or sub-module stored by application 220 and/or library 230. A module may be associated with a device (e.g., a router, a bridge, a switch, a gateway, a firewall, etc.) and/or feature of the device (e.g., firewall, ciphering, quality of service, buffering levels, etc.) that the user is interested in simulating. A module may have a default setting for different parameters of the module. For example, a module for a particular router's firewall may have a default setting for the capacity of network traffic entering the router's firewall service.

A sub-module may be associated with a parameter of the simulation that may be used to change one or more of the default settings of the module. For example, the user may want to use a sub-module to change the type of network traffic from voice communication traffic to multimedia traffic within the parameters of a module associated with a network area translation (NAT) feature.

Simulation name field 405 may permit a user, of computing device 210, to enter information that identifies a simulation to be performed on a network device. The information that identifies the simulation may, for example, include a unique simulation identifier (e.g., a name). Identifying the simulation may permit the user to store the simulation so that the simulation can be modified and/or re-run at a later time.

Device name field 410 may, when selected by the user, permit the user to select, from a drop down list, the type of network device that is to undergo simulation. For example, the user may select a router, a switch, a bridge, a server, a edge router, any other type of device, and/or a particular network device model type.

Testing feature field 415 may, when selected by the user, permit the user to select a module associated with the feature, for the network device selected in device name field 410. The user may be provided with a drop-down list of available features for the selected network device. For example, the user may select a firewall feature, a ciphering feature, a NAT feature, and/or any other type of feature associated with the operation of the network device selected by the user in device name field 410.

More features field 420 may, when selected by the user, permit the user to choose additional features (associated with a module and/or sub-module) that the user is interested in testing during the simulation. For example, the user may select other features (as described above) in addition to the feature selected in testing feature field 415.

Test library field 425 may, when selected by the user, permit the user to select one or more sub-modules from application 220 and/or library 230 that permit the user to create and/or change parameters of a simulation. For example, the user may simulate a test that requires running a simple network management protocol (hereinafter referred to as "SNMP") sub-module. SNMP is a protocol that may be selected by the user to permit the user to monitor the activities (e.g., amount of data flow, queuing rate information, etc.) of the network device under simulation. Additionally, or alternatively, the user may select a sub-module associated with monitoring the device status during the simulation by using a central processing unit utilization ("CPU utilization") sub-module. Additionally, or alternatively, the user may select a sub-module associated with other types of methods (e.g., SIPFix, Syslog) for retrieving data associated with monitoring the device status during the simulation. Additionally, or alternatively, test library field 425 may include other sub-modules (e.g., syntax values for Internet addresses) that permit the user to change and/or create other parameters for the simulation.

Change traffic parameters field 430 may, when selected by the user, permit the user to select one or more sub-modules associated with changing the network traffic parameters associated with the simulation. The user may be provided with a list of sub-modules (stored by application 220 and/or library 230) that are associated with network traffic parameters. For example, the user may change the rate of network traffic entering the network device (e.g., 10 GB/minute, 1000 GB/min, 500 MB/min, etc.), the type of network traffic (e.g., multimedia traffic, Internet traffic, voice communication traffic, etc.) entering the device, and/or the memory level (e.g., 10 MB, 1400 GB, 1000 MB, etc.) associated with the network traffic entering the device.

Network topology change field 435 may, when selected by the user, permit the user to change the network topology associated with the simulation. The user may be provided with a list of sub-modules (stored by application 220 and/or library 230) that are associated with network topology parameters. For example, the user may change the source of network traffic incoming to the device (selected in device name field 410), such as another router, a switch, a server, and/or another type of device. The user may also change the destination of the network traffic. For example, the network traffic may be sent to a router, switch, a server, and/or another type of device.

Debugging field 440 may, when selected by the user, permit the user to select one or more sub-modules associated with determining the parameters for debugging the simulation. For example, the user may select that if the simulation results in an error rate greater than 1%, then the simulation is to proceed to debug the simulation. If debugging field 440 is not selected by the user, application 220 may store a default threshold level associated with the types of features being tested and/or the type of device being tested. Application 220 may use the default threshold level to determine, based on the simulation result, whether debugging of the simulation should occur.

Run test field 445 may, when selected by the user, permit the user to run a simulation test by using application 220. New test field 450 may, when selected by the user, permit the user to start a new simulation. Exit test field 455 may, when selected by the user, cause application 220 to close user interface 400. When selecting exit test field 455, the user may be provided with an option to save the simulation.

When the user does not select a particular field (e.g., test library 425, network topology change field 435, debugging field 440, etc.), then application 220 may use default parameters stored by application 220 and/or library 230. Further, the user may be given the option not to select a particular parameter for testing. For example, the user may decide not to monitor the device associated with one or more of the selected features.

While FIG. 4 shows a user interface 400 as having a particular quantity and arrangement of fields, in other implementations, user interface 400 may include fewer fields, different fields, additional fields, or differently arranged fields than depicted in FIG. 4. Additionally, or alternatively, one or more fields of user interface 400 may include information described as being included in one or more other fields of user interface 400.

Figure 5A:
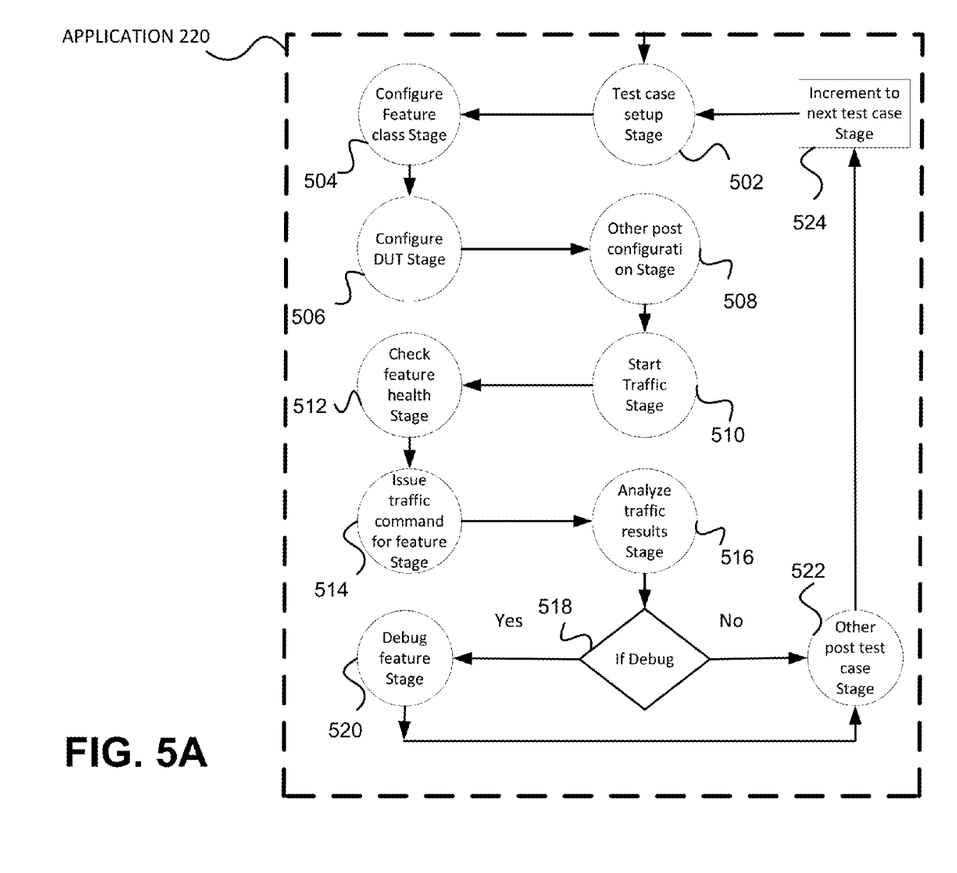
FIG. 5A is a diagram of an example application.

FIG. 5A is a diagram of an example application 220 that may be stored by computing device 210 and/or server 250. Application 220 may include a collection of stages that configure the parameters of a simulation, perform the simulation, analyze the results of the simulation, debug the simulation, and/or determine recommendations to improve the simulation.

Application 220 may include a collection of stages, such as test case setup stage 502, configure feature class stage 504, configure device under test stage 506 (hereinafter referred to as "configure DUT for feature stage 506"), other post configuration stage 508, start traffic stage 510, check feature health stage 512, issue traffic command for feature stage 514, analyze traffic results stage 516, debug option stage 518, debug feature stage 520, other post test case stage 522, and increment to next test case stage 524.

Test case setup stage 502 may be used by application 220 to receive the information inputted by the user via user interface 400. The information may be used by application 220 to determine which modules (associated with the features selected by the user and the network device selected by the user) are to be used during the simulation. Application 220 may obtain one or more modules from library 230 or application 220 may obtain one or more modules from a module library within application 220.

Configure feature class stage 504 may be used by application 220 to configure the feature selected by the user. Application 220 may determine, based on the user's selections, which sub-modules may be used to configure the feature. For example, the user may specify a memory requirement for a firewall feature and application 220 may determine that a sub-module associated with that memory requirement is to be used during the simulation. Application 220 may obtain one or more sub-modules from library 230 or application 220 may obtain one or more sub-modules from a sub-module library within application 220. Alternatively, the user may not change any of the configuration parameters of the feature and application 220 may obtain the feature module without changing the configuration of the feature.

Configure DUT stage 506 may be used by application 220 to configure the network device selected by the user. Application 220 may determine, based on the user's selections, one or more sub-modules that may be used to configure the network device. Application 220 may configure the network device by using information (stored by application 220) that relates the one or more modules and/or sub-modules with each other. For example, the user may select a firewall feature and a NAT feature. Application 220 may determine that there is a relationship between the two features associated with a quantity of memory (e.g., the selected firewall feature requires 400 MB and the selected NAT feature requires 40% of the firewall feature memory requirement). Application 220 may configure the network device to have the quantity of memory to permit the network device to use both the firewall feature and the NAT feature during the simulation. Additionally, application 220 may determine how the modules and/or sub-modules selected by the user (via user interface 400) may affect other parameters of the network device and application 220 may configure other parameters of the network device by selecting additional sub-modules to configure the network device. For example, the user may select a router used for multimedia traffic and application 220 may determine that a sub-module associated with multimedia traffic is to be used to configure the router. Application 220 may obtain a multimedia traffic sub-module from library 230 and incorporate the multimedia traffic sub-module into the simulation. Further, for example, application 220 may determine that using a multimedia traffic sub-module requires another sub-module associated with a particular type of NAT, such as NAT 64, to be included in the simulation.

Other post configuration stage 508 may be used by application 220 to implement additional parameters during the simulation. These additional parameters may be based on selections made by the user, using user interface 400, and/or may be determined by information (e.g., information based on past simulations) stored by application 220. For example, the user may select (based on user inputs into user interface 400) a router to undergo a simulation with different time out features (the amount of time that lapses between different network traffic entering the router).

With the simulation parameters configured, start traffic stage 510 may be used by application 220 to start the process of simulating the network traffic. Application 220 may use the information from test case setup stage 502, configure feature class stage 504, configure DUT stage 506, and/or other post configuration stage 508 to simulate network traffic entering and/or leaving the network device. For example, if the simulation is for a router and the firewall feature, then application 220 may collect the information associated with the router and the firewall feature to be used during the simulation.

Check feature health stage 512 may be used by application 220 to monitor the status of the network device during the simulation. If there are multiple features selected by the user, then application 220 may determine that the monitoring of the status of the network device should occur within one feature and not another feature. For example, if the user selected a NAT feature and a firewall feature, then application 220 may determine that the NAT feature should be monitored and the firewall feature should not be monitored, because the NAT feature does not require the monitoring. Application 220 may use (default parameters or sub-modules based on the selections made by the user) different methods to monitor the status of the network device, such as SNMP, Syslog, SIPFix, and/or other types of monitoring methods.

Issue traffic command for feature stage 514 may be used by application 220 to issue traffic commands during the simulation. For example, application 220 may (using a default parameter or using sub-modules based on the selections made by the user) use a traffic command (e.g., increase traffic flow, decrease traffic flow, linearly increase traffic over time, linearly decrease traffic flow over time, etc.) during the simulation. The traffic command may be based on one or more configurations made by using one or more sub-modules from library 230.

Analyze traffic results stage 516 may be used by application 220 to analyze the results of the simulation. During this stage, application 220 may analyze the capability of the network device within the parameters of the simulation. Application 220 may determine whether the network device was able to function normally based on threshold level information stored by application 220. For example, if a particular router was selected and the firewall feature was selected, application 220 may determine that the difference between the incoming network traffic flow rate and the outgoing network traffic flow rate should be within a particular error rate (e.g., 0.01%, 0.05%, 0.004%, etc.). Application 220 may analyze the network traffic to determine whether various characteristics associated with the network traffic occurred. Application 220 may analyze other factors, such as buffering rates, percentage of network traffic that successfully receives a service (e.g., a ciphering service), latency issues, loss rates, data flooding rates, and/or any other type of factor associated with the selected network device. Application 220 may compare the factor of the network device, during the simulation, with information stored by application 220 to determine whether the network device performed within a threshold level associated with a particular factor. The threshold level may be associated with a default threshold level stored by application 220 or the threshold level may be associated with a parameter (e.g., change traffic parameters field 430) selected by the user in user interface 400.

Debug option stage 518 may be used by application 220 to determine whether to debug the simulation, which may include finding errors during the simulation, and/or correcting the errors during the simulation. Application 220 may use the results from the analyze traffic results stage 516 to determine whether the simulation resulted in various characteristics and/or parameters being more than a threshold level (described above). If the simulation resulted in results that exceeded a threshold level, then application 220 may determine that the simulation should be debugged and application 220 may use debug feature stage 520 to debug the simulation and/or correct errors during the simulation.

Debug feature stage 520 may debug the simulation by changing various parameters of the simulation and re-running the simulation. The debugging activity by application 220 may include removing one feature from multiple features selected by the user and re-running the simulation without the removed feature. Additionally, or alternatively, application 220 may change the order of the features during the simulation to determine whether the order of the features is the source of the error in the simulation. Additionally, or alternatively, application 220 may re-run the simulation by changing the scale of the simulation. For example, application 220 may re-run the simulation at a scaled level (e.g., running the simulation at 10% of the actual traffic levels associated with the network device) instead of running the simulation at a functional level (e.g., running the simulation at 100% of the actual traffic levels associated with the network device). Application 220 may send the results of the debugging to other post test case stage 522.

If during the debug option stage 518, application 220 determines that the simulation does not require debugging (based on the simulation resulting in results that are less than threshold levels associated with the simulation), then other post test case stage 522 may be used by application 220 to provide results to the user (via user interface 400), provide recommendations to the user to improve the simulation, and/or provide other information to the user. The user may use the recommendations to change the simulation and/or change the simulation based on the user's preferences and may decide to start another simulation by using increment to next test case stage 524.

Increment to next test case stage 524 may be used by application 220 to start the next simulation. The next simulation may start automatically based on the initial inputs of the user. For example, the user may have requested that there should be multiple simulations for different network traffic flows (e.g., 100 GB/min, 50 MB/min, 1000 GB/min, etc.). Alternatively, application 220 may determine that there should be multiple simulations based on information stored by application 220. Alternatively, the next simulation may be started based on the user deciding to start the next simulation based on making changes to the simulation (e.g., changing the simulation based on the results of debugging the simulation as described above).

While FIG. 5A shows example stages 502-524, in other implementations, application 220 may include fewer stages, different stages, additional stages, or differently arranged stages than depicted in FIG. 5A. Additionally, or alternatively, one or more stages of application 220 may include information described as being included in one or more other stages of application 220.

Figure 5B:
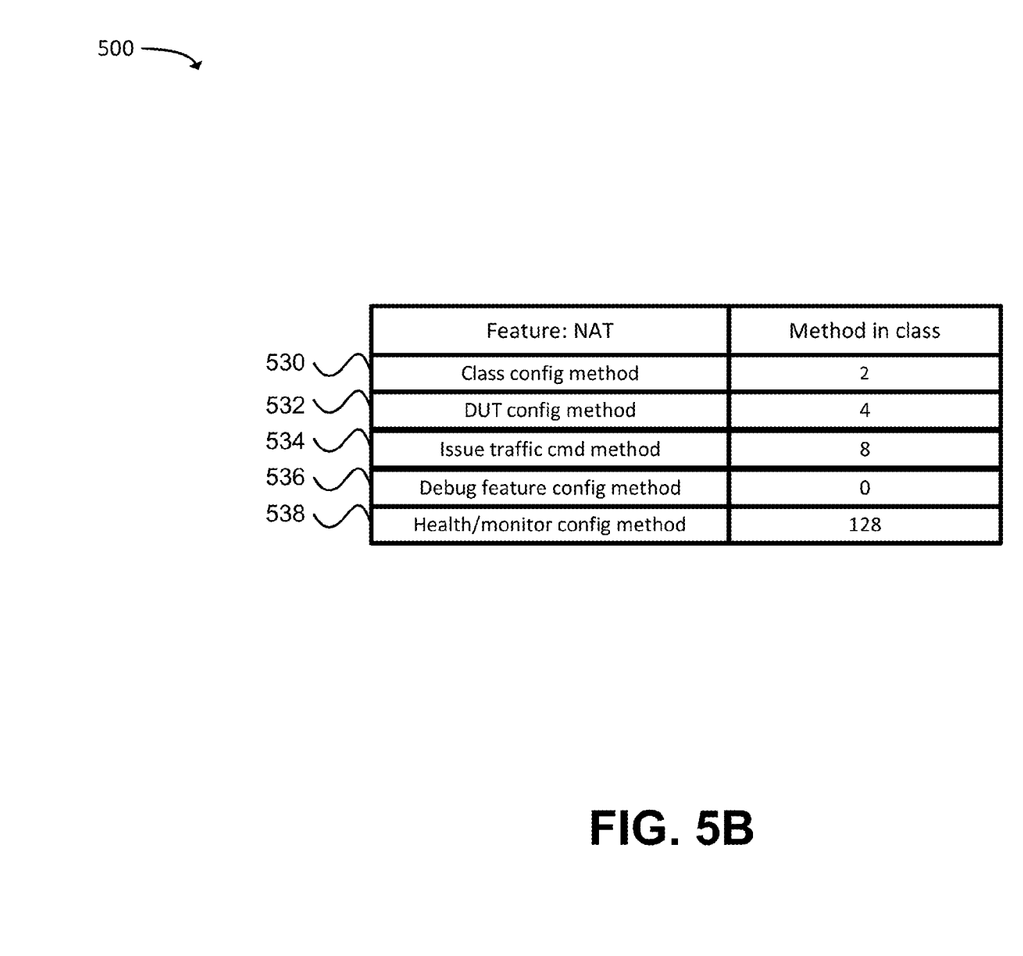
FIG. 5B is a diagram of an example module.

FIG. 5B is a diagram of an example data structure 500 that may be stored by application 220 and/or library 230. Data structure 500 may correspond to a module that is associated with a feature and/or network device selected by the user using user interface 400. One or more data structure 500 may be used by application 220 to perform the simulation.

Data structure 500 may include a collection of fields, such as class configuration method field 530, device under test configuration method field 532, issue traffic command method field 534, debug feature configuration method field 536, and health/monitor configuration method field 538. The configuration information may be associated with a sub-module selection based on the user's selection in user interface 400 or may be associated with a default method associated with data structure 500. As shown in FIG. 5B, each numerical value is associated with a type of method (associated with a sub-module and/or module) for each field. In other implementations, a code (e.g., "XYZ123"), a name (e.g., firewall), or another type of identifier may be used to identify the type of method being used within data structure 500.

Class configuration method field 530 may store configuration information associated with a feature based on a user's selection of a feature using, for example, device name field 410 and testing feature field 415 described with regard to FIG. 4.

Device under test configuration method field 532 may store configuration information associated with the device selected for simulation based on the user's selection of a device in device name field 410 described with regard to FIG. 4.

Issue traffic command method field 534 may store network traffic configuration information associated with the simulation based on a user's selection in change traffic parameters field 430, network topology change field 435, and/or other fields described with regard to FIG. 4.

Debug feature configuration method field 536 may store debugging information associated with the simulation based on the selections made by the user in selecting debugging field 440 described with regard to FIG. 4.

Health/monitor configuration method field 538 may store configuration information associated with monitoring the condition of the device during the simulation. The configuration information may be based on the user selecting one or more sub-modules from test library 425 that are associated with monitoring the condition of the device.

In the example, shown in FIG. 5B, fields 530-538 are associated with numerical values for a NAT feature that is associated with a device under simulation. For example, class configuration method field 530 is associated with the value "2," which may indicate that a particular time out method is configured for the particular feature selected by the user. Device under test configuration field 532 is associated, for example, with the value "4," which may indicate that the device selected for simulation is a router. Issue traffic command method field 534 is associated, for example, with the value "8," which may indicate that the traffic commands are associated with multimedia traffic. Debugging feature method field 536 is associated, for example, with the value "0," which may indicate that the debugging is based on information stored by application 220. Health/monitor method field 538 is associated, for example, with the value "128," which may indicate that the monitoring of the simulation is based on using SNMP.

For fields 530-548, if the user does not select a particular parameter, in user interface 400, then application 220 may use the default configuration stored by data structure 500. For example, the user may select an option that indicates that a default parameter (e.g., a default traffic rate) may be used during the simulation.

While FIG. 5B shows example fields 530-538, in other implementations, data structure 500 may include fewer fields, different fields, additional fields, or differently arranged fields than depicted in FIG. 5B. Additionally, or alternatively, one or more fields of data structure 500 may include information described as being included in one or more other fields of data structure 500.

Figure 6:
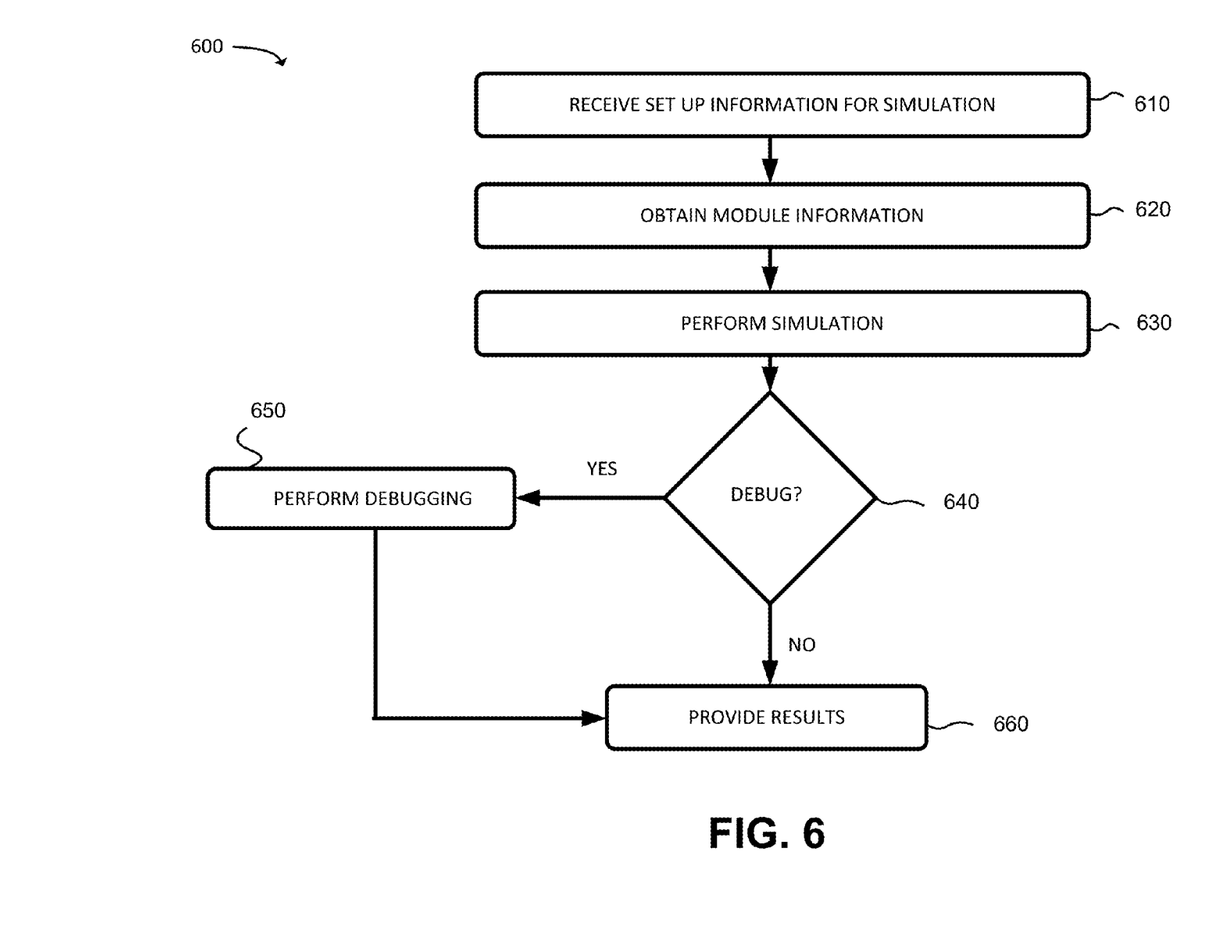
FIG. 6 is a flow chart of an example process for setting up and performing a simulation.

FIG. 6 is a flow chart of an example process 600 for setting up and performing a simulation. In one example implementation, process 600 may be performed by computing device 210. In another example implementation, one or more blocks of process 600 may be performed by one or more other devices, such as server 250 and/or memory device 260.

Process 600 may include receiving set up information for a simulation (block 610). For example, a user, of computing device 210, may provide set up information for a simulation via a command line interface (e.g., by using a keyboard to enter data via the command line interface) and/or by selecting a button or series of buttons on user interface 400 (described with regard to FIG. 4) associated with application 220. The set up information may include one or more of the selections available to the user via user interface 400 as described with regard to fields 405-455 in FIG. 4. Computing device 210, via application 220, may receive the set up information.

Process 600 may include obtaining module information (block 620). In one example implementation, application 220 may request and receive module information from library 230 stored by computing device 210 and/or memory device 260. In another example implementation, application 220 may obtain module information from a library of modules stored by application 220. In either example implementation, application 220 may determine the module information based on the user's selections in user interface 400 (described with regard to FIG. 4). For example, based on the user selecting a particular router, application 220 may obtain one or more modules from, library 230, associated with the particular router.

Process 600 may include performing a simulation (block 630). For example, application 220 (using one or more of the stages associated with application 220 described with regard to FIG. 5A) may perform a simulation according to the parameters of the simulation provided by the user via user interface 400 described with regard to FIG. 4. The simulation may include configuring one or more modules; running the simulation; determining error rates during the simulation; and/or other actions associated with the simulation as described with regard to FIGS. 5A-5B.

If the simulation requires debugging (block 640—YES), then process 600 may include performing debugging (block 650). Application 220 may determine that the simulation has resulted in an error rate that exceeds a default threshold level (stored by application 220) for a particular module associated with a particular device, described with regard to debug option stage 518 in FIG. 5A and may determine that debugging should be performed on the simulation. For example, application 220 may store information that the simulation of firewall features of a router may not exceed an error rate (e.g., 1.5%, 0.08%, 1%, etc.) for that particular simulation. Alternatively, the debugging feature may occur based upon a threshold level that is inputted by the user using user interface 400 associated with application 220. For example, the user may enter a threshold value (e.g., delays associated with the buffering of network traffic should not exceed 0.01 seconds, 0.05 seconds, 0.02 seconds, etc.) from change traffic parameters 430 (described with regard to FIG. 4) and application 220 may use that threshold value to determine whether to debug the simulation. Alternatively, the debugging feature may occur automatically for the simulation, based on information stored by application 220 or based on the user requesting (e.g., via one of the fields in user interface 400) an automatic debugging of the simulation.

Application 220 may provide the user with the results of the debugging activity (block 660). For example, application 220 may provide the user with a report that identifies the total number of errors that occurred, where the errors occurred during the simulation, and a solution to reducing the total number of errors that occurred during the simulation.

If the simulation does not require debugging (block 650—NO), then process 600 may include providing results (block 660). For example, the results may be provided to the user by using user interface 400 associated with application 220. User interface 400 may display the results to the user of computing device 210 by using different text, images, icons, windows, colors, thumbnails, and/or other data within the graphical user interface. Additionally, or alternatively, user interface 400 may include charts, flow charts, pie charts, and/or any other type of chart that be used to describe the results of the simulation. Additionally, or alternatively, user interface 400 may display the results of any debugging activities (described with regard to block 650) associated with the simulation. User interface 400 may, for example, show a relationship between how different features (e.g., firewall features and NAT features of a router) interact with each other. Additionally, or alternatively, user interface 400 may display recommendations to the user. For example, the recommendations may include changes to the simulation (e.g., recommend different network parameters such as changing the network traffic, network topology, protocols associated with the traffic, time out features, etc.) to reduce the number of errors and the subsequent debugging associated with finding the errors associated with the simulation.

While FIG. 6 shows process 600 as including a particular quantity and arrangement of blocks, in some implementations, process 600 may include fewer blocks, additional blocks, or a different order of blocks. Additionally, or alternatively, some of the blocks may be performed in parallel.

Figure 7A:
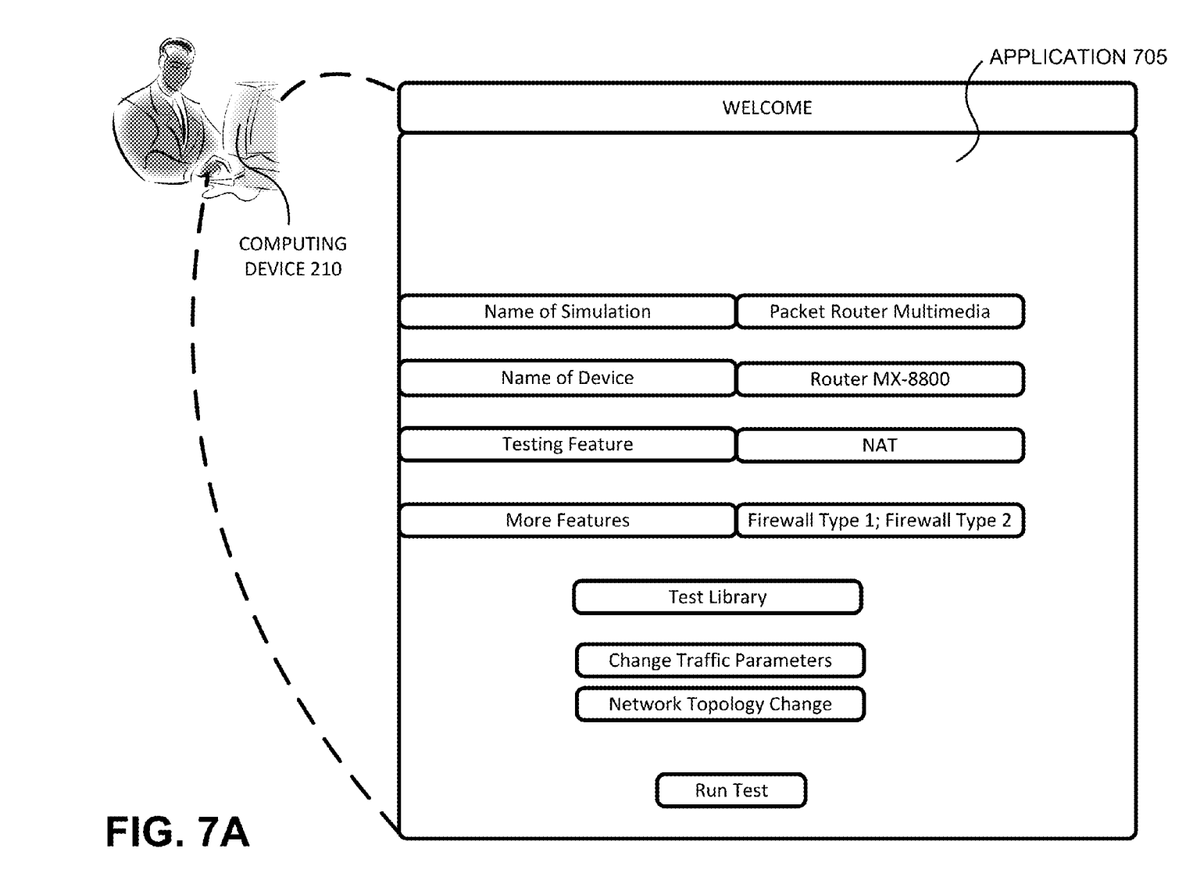
FIGS. 7A-7B are diagrams illustrating an example of a system and/or method described herein.
Figure 7B:
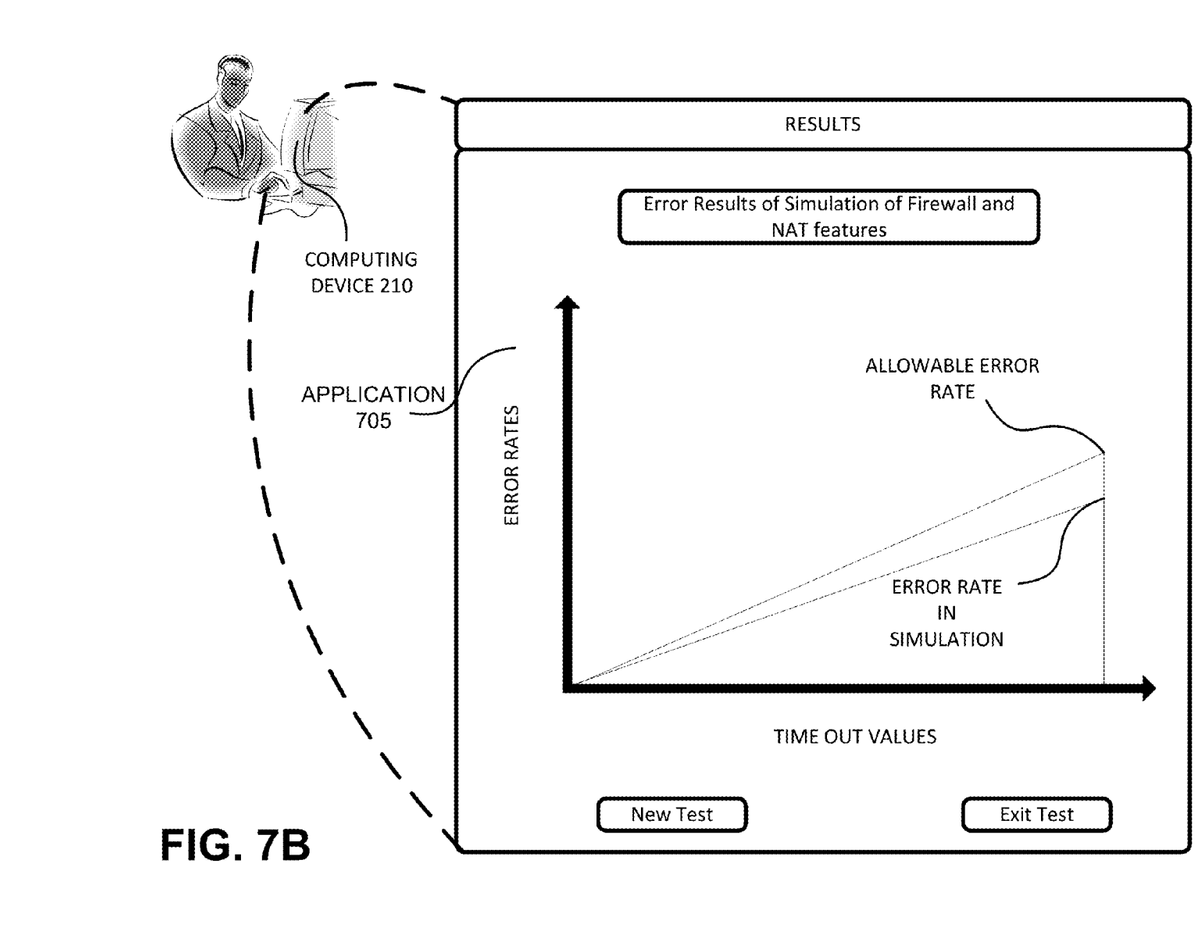

FIGS. 7A-7B are diagrams of example processes for setting up and performing a simulation. FIGS. 7A-7B show computing device 210 and application 705. Application 705 may correspond to application 220 described with regard to FIG. 2.

Tom has been given the task of performing a simulation test of a router. As shown in FIG. 7A, Tom is using computing device 210. Assume that Tom selects an icon on the display screen of computing device's 210 that permits Tom to use application 705. Upon opening application 705, Tom is presented with a user interface (associated with application 705) that provides Tom with a number of options for setting up the simulation. Tom enters a name for the simulation, "Packet Router Multimedia," into the name of simulation. Tom then selects a device from a drop-down list of devices in the name of device field. Tom chooses Router MX-8800 from the list. Tom is then given the option to select the feature to test (in the testing feature field) and Tom select the NAT feature as the router feature from a list of features. Tom also selects additional features (in more features to test field) for the simulation and selects firewall type 1 and firewall type 2. Assume that when Tom selects these particular features, application 705 obtains modules (similar to data structure 500 described with regard to FIG. 5) associated with each feature from a library (such as library 230). In the test library field, Tom selects (assume from a drop-down list) a SIPFix sub-module to be used during the simulation and also selects that the SIPFix sub-module be associated with network traffic. In the change traffic parameters field, Tom selects a multimedia traffic sub-module as the type of network traffic that will be used in the simulation. In the network topology change field, Tom may create a network topology to simulate the topology in which Router MX-8800 may be used. This may result in application 705 selecting additional sub-modules based on Tom's network topology. Assume that when Tom selects these parameters, application 705 obtains these sub-modules from library 230. Upon entering the parameters of the simulation, Tom selects the run test field.

As shown in FIG. 7B, application 220 may provide the error rates based on the parameters selected by Tom in FIG. 7A. Assume that application 705 uses the modules and the sub-modules to run the simulation (in a manner similar to that described with regard to FIG. 5A) to provide Tom with a result. The result is provided to Tom by using a line graph depicting the allowable error rate and the error rate that occurred during the simulation for the firewall and NAT features of the router selected by the user.

Implementations, described herein, may provide a system and/or method for using an application to simulate how a device may operate and how different features of the device may interact with each other and how those interactions may result in a successful test. The application may also provide a user (of the application) information on what parts of the test may be causing problems during the simulation. The application may allow a user to change the simulation and determine problems during the simulation.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system comprising:
  a computing device to:
    receive information for setting up a simulation of a network device;
    request one or more modules corresponding to one or more features associated with the simulation based on receiving the information,
      the one or more features relating to an operation of the network device,
      the one or more features including a firewall feature, a ciphering feature, a quality of service feature, or a buffering levels feature;

receive the one or more modules based on requesting
the one or more modules,
the one or more modules having a relationship with
different modules stored by the computing device;
perform the simulation using the one or more modules
and the different modules;
determine that the simulation requires debugging based
on a result of the simulation;
debug the simulation based on determining that the
simulation requires debugging,
where the computing device, when debugging the
simulation, is to at least one:
remove a feature of the one or more features and
re-perform the simulation using the one or more
modules without using a module, of the one or
more modules, that corresponds to the feature
that is removed,
change an order of the one or more features during
simulation and re-perform the simulation, or
change a scale of a traffic level for the simulation
and re-perform the simulation at a scaled traffic
level; and
provide the result of the simulation including information associated with debugging the simulation.

2. The system of claim 1, where the computing device is further to:
receive an instruction to perform a second simulation using a monitoring test during the second simulation;
receive a sub-module associated with performing the monitoring test during the simulation; and
perform the second simulation using the sub-module.

3. The system of claim 1, where, when performing the simulation, the computing device is to:
perform the simulation using a module associated with a utilization type of protocol used for monitoring network traffic; and
perform the simulation using a module associated with a feature associated with an address type for the network traffic.

4. The system of claim 1, where, when requesting the one or more modules, the computing device is to:
request a module associated with a first type of feature associated with the network device;
request a module associated with a second type of feature associated with the network device,
the second type of feature being different than the first type of feature; and
where, when performing the simulation, the computing device is to:
perform the simulation using the module associated with the first type of feature and the module associated with the second type of feature.

5. The system of claim 1, where, when requesting the one or more modules, the computing device is to:
request a first sub-module associated with a first parameter associated with the simulation;
request a second sub-module associated with a second parameter associated with the simulation; and
where, when performing the simulation, the computing device is to:
perform the simulation using the first sub-module associated with the first parameter and the second sub-module associated with the second parameter.

6. The system of claim 1, where, when providing the result of the simulation, the computing device is to:
provide the result including identifying that a number of errors is greater than a threshold level of errors; and
recommend changes to be made to the simulation to reduce the number of errors below the threshold level of errors.

7. The system of claim 1, where, when performing the simulation, the computing device is to:
monitor a condition of the network device during the simulation using a simple network management protocol.

8. A method comprising:
receiving, by a computing device, information for setting up a simulation of a network device;
requesting, by the computing device, one or more modules corresponding to one or more features associated with the simulation based on receiving the information,
the one or more features relating to an operation of the network device,
the one or more features including a firewall feature, a ciphering feature, a quality of service feature, or a buffering levels feature;
receiving, by the computing device, the one or more modules based on requesting the one or more modules,
the one or more modules having a relationship with different modules stored by the computing device;
performing, by the computing device, the simulation using the one or more modules and the different modules and using the relationship between the one or modules and the different modules;
determining, by the computing device, to debug the simulation based on a result of the simulation;
debugging, by the computing device, the simulation based on determining that the simulation requires debugging,
where debugging the simulation includes at least one of:
removing a feature of the one or more features and re-performing the simulation using the one or more modules without using a module, of the one or more modules, that corresponds to the feature that is removed,
changing an order of the one or more features during simulation and re-performing the simulation, or
changing a scale of traffic levels for the simulation and re-performing the simulation at a scaled traffic level; and
providing, by the computing device, the result of the simulation including information associated with debugging the simulation.

9. The method of claim 8, where determining to debug the simulation includes:
determining that a number of errors, in the result of the simulation, is greater than a threshold level of errors; and
where providing the result of the simulation includes:
providing a recommendation to reduce the number of errors.

10. The method of claim 8, where determining to debug the simulation includes:
determining a relationship between a first feature of the network device and a second feature of the network device; and
determining how errors in the simulation are associated with the relationship between the first feature of the network device and the second feature of the network device.

11. The method of claim 8, further comprising:
receiving an instruction to increase a number of features being simulated;

receiving, based on receiving the instruction, an additional module to permit the computing device to increase the number of features being simulated; and performing a second simulation based on receiving the additional module.

12. The method of claim 8, further comprising:

receiving an instruction for setting up a second simulation to change a minimum amount of errors permitted during the second simulation; and performing the second simulation based on the minimum amount of errors permitted during the second simulation.

13. The method of claim 8, further comprising:

receiving an instruction for setting up a second simulation to use new traffic flow information for the simulation;

receiving a sub-module associated with the new traffic flow information; and performing the second simulation based on using the sub-module.

14. A non-transitory computer-readable medium comprising:

a plurality of instructions, that when executed by one or more processors of a computing device, cause the one or more processors to:

receive information for setting up a simulation of a network device;

request one or more modules corresponding to one or more features associated with the simulation based on receiving the information, the one or more features including a firewall feature, a ciphering feature, a quality of service feature, or a buffering levels feature;

receive the one or more modules based on requesting the one or more modules, the one or more modules having a relationship with different modules stored by the computing device;

perform the simulation using the one or more modules, the different modules, and the relationship between the different modules and the one or more modules;

determine to debug the simulation based on a result of the simulation, debug the simulation based on determining to debug the simulation, where the plurality of instructions, that cause the computing device to debug the simulation, cause the computing device to at least one of:

remove a feature of the one or more features and re-perform the simulation using the one or more modules without using a module, of the one or more modules, that corresponds to the feature that is removed, change an order of the one or more features during simulation and re-perform the simulation, or change a scale of traffic levels for the simulation and re-perform the simulation at a scaled traffic level; and provide the result of the simulation including information associated with debugging the simulation.

15. The non-transitory computer-readable medium of claim 14, where the plurality of instructions further cause the one or more processors to:

receive an instruction to perform a second simulation, the second simulation being based on removing a first module and adding a second module;

perform the second simulation; and provide a second result, the second result including a recommendation to perform a third simulation that includes using a third module.

16. The non-transitory computer-readable medium of claim 14, where the plurality of instructions further cause the one or more processors to:

receive a request to use an additional feature within a second simulation;

receive a sub-module associated with the additional feature; and perform the second simulation based on using the sub-module.

17. The non-transitory computer-readable medium of claim 16, where the plurality of instructions further cause the one or more processors to:

receive a second request to remove the additional feature from the second simulation; and perform the second simulation based on receiving the second request.

18. The non-transitory computer-readable medium of claim 14, where the plurality of instructions further cause the one or more processors to:

receive a request to change traffic information associated with a first feature being used within the simulation without any change to traffic information associated with a second feature being used within a second simulation; and perform the second simulation based on changing the traffic information associated with the first feature.

19. The non-transitory computer-readable medium of claim 14, where the plurality of instructions further cause the one or more processors to receive a request to use multimedia traffic within a second simulation;

receive a sub-module associated with the multimedia traffic; and perform the second simulation based on using the sub-module.

20. The non-transitory computer-readable medium of claim 14, where the plurality of instructions further cause the one or more processors to:

receive a request to change the network device to a different device within a second simulation;

receive a module associated with the different device; and perform the second simulation based on receiving the request.

* * * * *